(12) United States Patent
Kim et al.

(10) Patent No.: US 11,198,412 B1
(45) Date of Patent: Dec. 14, 2021

(54) ANCHOR ASSEMBLY FOR SAFETY VEST IN VEHICLES

(71) Applicants: Hoon Y. Kim, Chicago, IL (US); Hyun S Kim, Chicago, IL (US)

(72) Inventors: Hoon Y. Kim, Chicago, IL (US); Hyun S Kim, Chicago, IL (US)

( * ) Notice: Subject to any disclaimer, the term of this patent is extended or adjusted under 35 U.S.C. 154(b) by 75 days.

(21) Appl. No.: 16/881,155

(22) Filed: May 22, 2020

Related U.S. Application Data

(60) Provisional application No. 62/873,536, filed on Jul. 12, 2019.

(51) Int. Cl.
*B60R 22/26* (2006.01)
*B60R 22/02* (2006.01)

(52) U.S. Cl.
CPC ........ *B60R 22/26* (2013.01); *B60R 2022/027* (2013.01)

(58) Field of Classification Search
CPC ..................................................... B60R 22/26
USPC ......................................................... 297/484
See application file for complete search history.

(56) References Cited

U.S. PATENT DOCUMENTS

| | | | |
|---|---|---|---|
| 579,818 A | 3/1897 | Cooley | |
| 3,385,633 A | 5/1968 | Aizley | |
| 4,709,966 A * | 12/1987 | Parkinson | B60R 22/105 297/484 |
| 5,628,548 A | 5/1997 | Lacoste | |
| 5,664,844 A * | 9/1997 | Greene | A47D 15/006 297/484 |
| 5,733,014 A | 3/1998 | Murray | |
| 6,402,251 B1 * | 6/2002 | Stoll | B60N 2/265 297/484 |
| 9,067,561 B2 | 6/2015 | Crews | |
| 2009/0026820 A1 | 1/2009 | Dunblazier et al. | |
| 2009/0212549 A1 | 8/2009 | Jones | |
| 2011/0181089 A1 | 7/2011 | Hendricks et al. | |
| 2013/0009445 A1 | 1/2013 | Cooper | |
| 2019/0135225 A1 | 5/2019 | Kim | |

* cited by examiner

*Primary Examiner* — Anthony D Barfield
(74) *Attorney, Agent, or Firm* — Husch Blackwell LLP

(57) ABSTRACT

The present invention relates to accessory systems for enhancing the security of restraint system used in a vehicle with a lap seatbelt system. A plurality of straps can placed on the upper surface of a vehicle seat and configured to provide a secure connection between the shoulders of the restraint system and an upper portion of the vehicle seat, the anchoring system securing the torso of the individual to the seat back. An optional plurality of straps are configured to provide a supplemental connection between the anchoring system and a rear portion of the seat, tethering the anchoring system to the vehicle to anchoring structures in the floor of the vehicle or the bottom portion of the seat. The straps can be adjusted to accommodate different heights in wearers, seats backs, and vehicle seats, making the restraint user adjustable for use by different wearers and in different vehicles.

17 Claims, 5 Drawing Sheets

ANCHOR ASSEMBLY FOR SAFETY VEST IN VEHICLES

CROSS REFERENCE TO RELATED APPLICATIONS

This application claims priority to U.S. Provisional Patent Application No. 62/873,536 filed Jul. 12, 2019 and titled "ANCHOR ASSEMBLY FOR SAFETY VEST IN VEHICLES." U.S. Provisional Patent Application No. 62/873,536 is hereby fully incorporated by reference as if set forth fully herein.

BACKGROUND

Motor vehicle crashes are a leading cause of death and injury in the United States. Motor vehicles commonly contain restraint systems in the form of lap belts and shoulder belts for securing a passenger to a vehicle seat. Presently, there are harness safety systems for securing individuals, especially smaller individuals such as children, to the lap and shoulder belts in the vehicles.

While combination lap-and-shoulder seat belts are preferred safety restraint systems in automotive vehicles, some vehicles lack a shoulder restraint. These vehicles rely on a lap belt to secure occupants of the vehicle. Such lap belts secure an individual to the seat at two points, on either side of the waist. Such lap belts secure individuals wearing harness safety systems similarly.

For an individual secured with only a lap belt (and no shoulder restraint), there is a need for a supplemental assembly to anchor the individual's torso to the seat. In particular, there is a need for an anchor assembly to secure an individual's safety restraint system so that the wearer's upper torso is secured to the seat.

DESCRIPTION OF THE INVENTION

Figure 1:
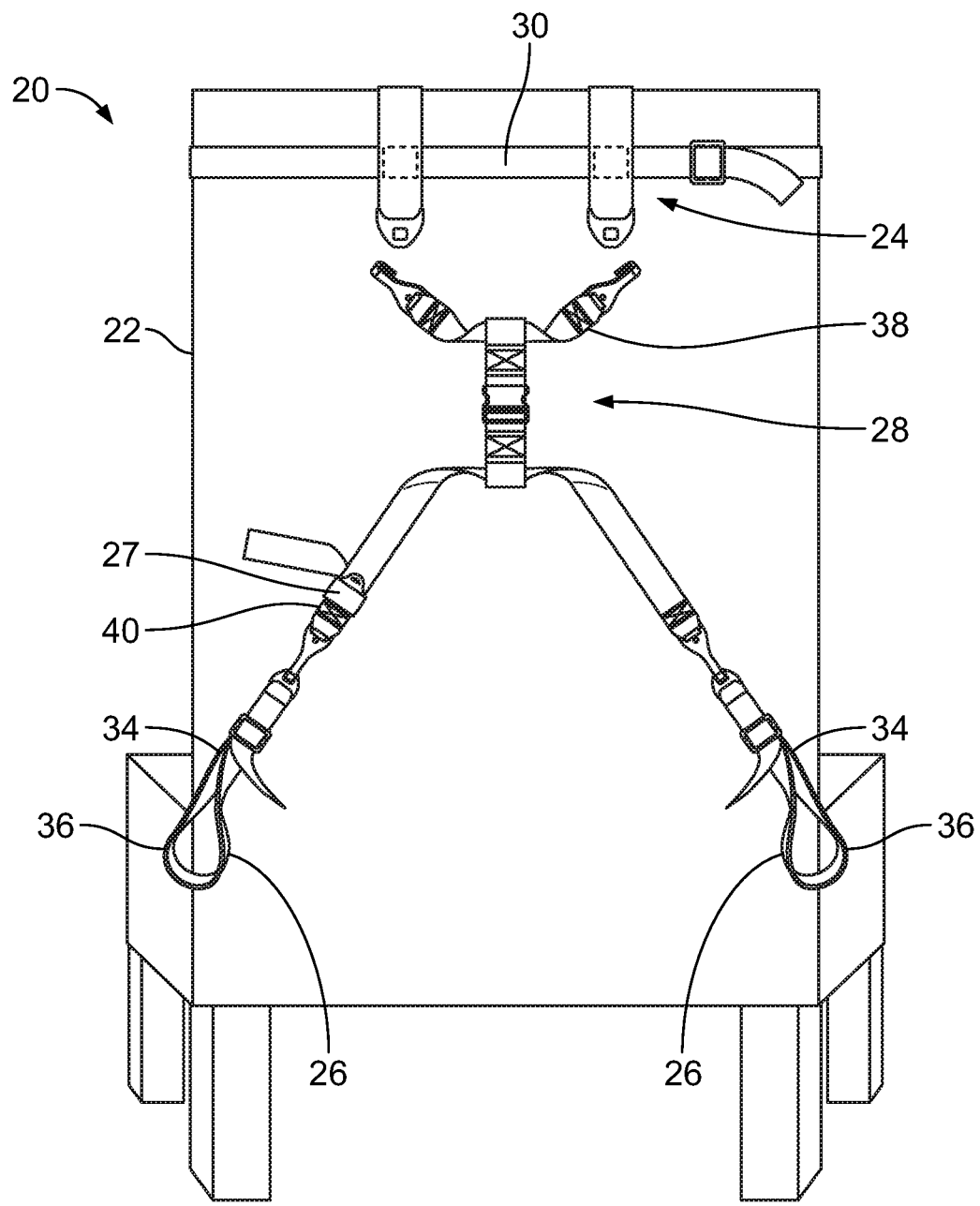
FIG. 1 and FIG. 2 show a safety harness attachment system according to disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

The present invention relates to accessories for use with a safety harness having a lap panel (the lap panel for securing a lap belt in the seat of a bus, airplane, or other vehicle. Such harnesses secure the wearer to the lap belt, anchoring the wearer to the portion of the seat they are sitting on. The anchoring apparatus is secured to the back of the seat and both shoulders of the safety harness are secured to the anchoring apparatus, securing the wearer to the portion of the seat contacting his back.

In some embodiments, the anchor assembly includes an adjustable loop of material for encircling the back of the seat, the adjustable loop portion to be oriented in a horizontal plane when in use. The anchor assembly includes a strap having each end fixed to the adjustable first and second locations on the adjustable loop. When placed on the back member of the vehicle seat, the adjustable loop will be oriented in a horizontal plane around the seat back member and the strap will be arranged in a vertical plane perpendicular to the adjustable loop. The strap will contact an upper portion of the seat back, a first end segment contacting the front surface of the seat, a central segment contacting the top surface of the seat, and a second end segment contacting the rear or back surface of the seat, respectively. The first and second ends of the strap are secured or affixed to the adjustable loop. When the anchor assembly is in use, the first end can be proximate to the front surface of the vehicle seat, while the second end can be proximate to the rear surface of the vehicle seat.

The adjustable loop portion can include a pair of attachment members for securing the shoulders of the safety harness. Each attachment member can include a loop of material that encircles the adjustable loop, sized so as to slide along the adjustable strap, as well as a portion for connecting to a structure on the shoulder of the safety harness. For example, each attachment member can comprise a loop of material for slidingly engaging the adjustable strap, as well as a tab comprising a fastener. The fastener can include, for example, a snap, button, Velcro pad, or other commonly used fastener. When attached to a vehicle seat, these attachment members will be located proximate to the front surface of the back member of the vehicle seat.

The length of the strap can be adjusted allow the anchor assembly to be engaged at different heights of the vehicle back member. This allows the assembly to be adjusted for a secure fit, depending on the height of the wearer and the height of the seat. The centrally-located strap keeps the adjustable loop anchored to the top portion of the vehicle seat back member.

To engage both shoulders of a safety harness, a pair of attachment members can be used. Preferably, one attachment member slidingly engages a first portion of the adjustable strap (between the first and second ends of the strap), while another attachment member slidingly engages a second portion of the adjustable strap (between the first and second ends of the strap).

To engage the safety harness to the back of the vehicle seat, a tethering apparatus can be employed. Such tethering apparatus can attach to a pair of anchor members fixed to the adjustable loop. One tethering apparatus can be fixed to the adjustable loop proximate to one side of the second end of the strap, while another tethering apparatus can be fixed to the adjustable loop proximate to the other side of the second end of the strap.

When attached to a vehicle seat, these anchor members will be located proximate to the rear surface of the back member of the vehicle seat.

The anchor members can be connected to structures to the rear portion of the vehicle seat back member via an adjustable four-point tether member. The tether member can include a central strap, with an upper strap and a lower strap connected to the top and bottom ends of the central strap. The upper strap can include first and second arms for attached to first and second anchor members. The lower strap can include first and second arms for securing to structures in the rear portion of the vehicle seat. For example, the arms of the lower straps can loop around rod like structures, such as seat legs. As another example, the arms of the lower straps can include fasteners such as hooks or loops for engaging an anchor loop in the floor of the vehicle.

Figure 2:
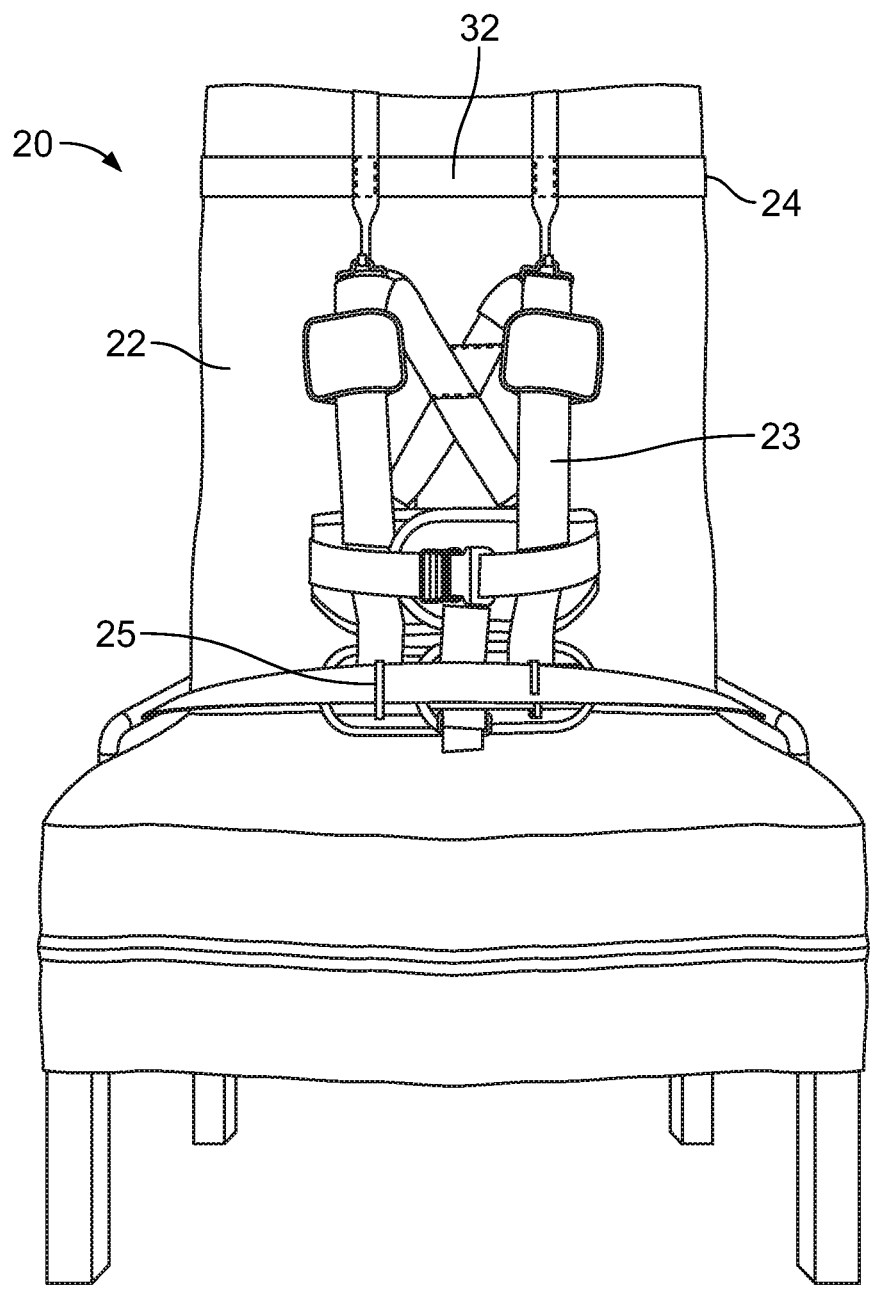

FIG. 1 and FIG. 2 show a safety harness attachment system 20 attached to a seat 22 and coupled to a safety harness 23 according to disclosed embodiments. As seen in FIG. 1, the safety harness attachment system 20 can include an upper attachment strap 24 configured to receive a top portion of the seat 22, one or more lower attachment straps 26, a tethering strap 28, and a strap tightening mechanism 27. As seen in FIG. 2 when the safety harness 23 is coupled to the safety harness attachment system 20 a lap belt 25 can be coupled to the safety harness 23 to further secure the safety harness 23 in the seat 22.

As seen in FIG. 1 and FIG. 2, the upper attachment strap 24 can include a rear portion 30 and a front portion 32 configured to couple and decouple the front portion 32 to and from the safety harness 23. In some embodiments, the one or more lower attachment straps 26 can include a respective upper portion 34 and a respective loop segment 36 that couple the lower attachment straps 26 to a lower portion of the seat 22. Furthermore, in some embodiments, the tethering strap 28 can include a first section 38 configured to couple and decouple the tethering strap 28 to and from the rear portion 30 and a second section 40 configured to couple and decouple the tethering strap 28 to and from the respective upper portion 34 of the one or more attachment straps 26.

Various embodiments for the strap tightening mechanism 27 are contemplated. For example, as seen in FIG. 1, in some embodiments the strap tightening mechanism 27 can be coupled to the second section 40 of the tethering strap 28. However, additional embodiments where the strap tightening mechanism 27 is coupled to the section 38 of the tethering strap 28, the upper attachment strap 24 and/or the one or more lower attachment straps 26 are also contemplated. In operation, the strap tightening mechanism 27 is configured to tighten the strap to which it is coupled such that when the tightening mechanism is tightened the upper attachment strap 30 is secured to the lower portion of the seat 22 through the tethering strap 28 and the one or more lower attachment straps 26.

Figure 3A:
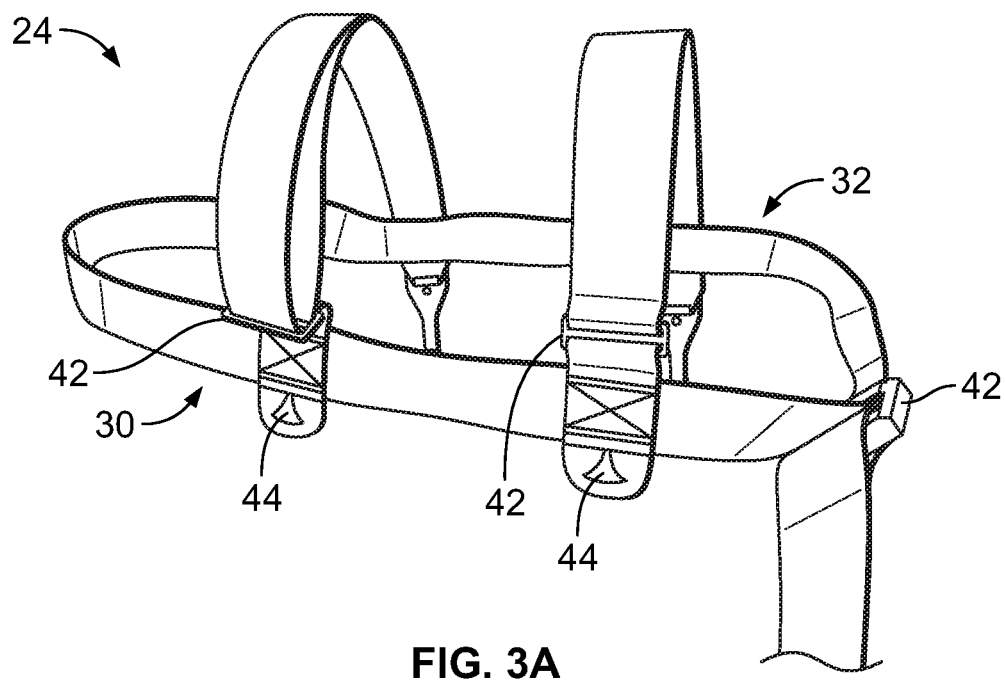
FIG. 3A and FIG. 3B are a perspective view of an upper attachment strap according to disclosed embodiments.
Figure 3B:
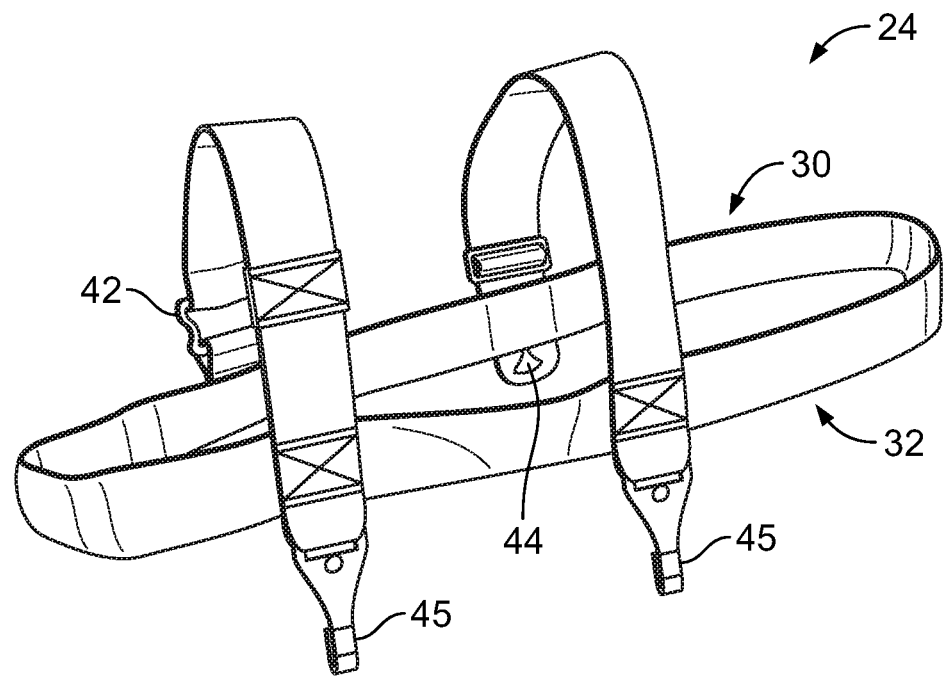

FIG. 3A and FIG. 3B are perspective views of the upper attachment strap 24 according to disclosed embodiments. As seen in FIG. 3A and FIG. 3B, in some embodiments, the upper attachment strap 24 can include a strap tightening mechanisms 42 configured to tighten the upper attachment strap 24 to secure the upper attachment strap 44 to the top portion of the seat 22. Furthermore, in some embodiments, the upper attachment strap 24 includes one or more eye hole mounts 44 for coupling the upper attachment strap 24 to the tethering strap 28 and one or more fastening elements 45 for coupling the upper attachment strap 24 to the safety harness 23. In some embodiments, the fastening elements 45 can be replaced with additional eye hole mounts used to couple the upper attachment strap 24 to the safety harness 23.

Figure 4:
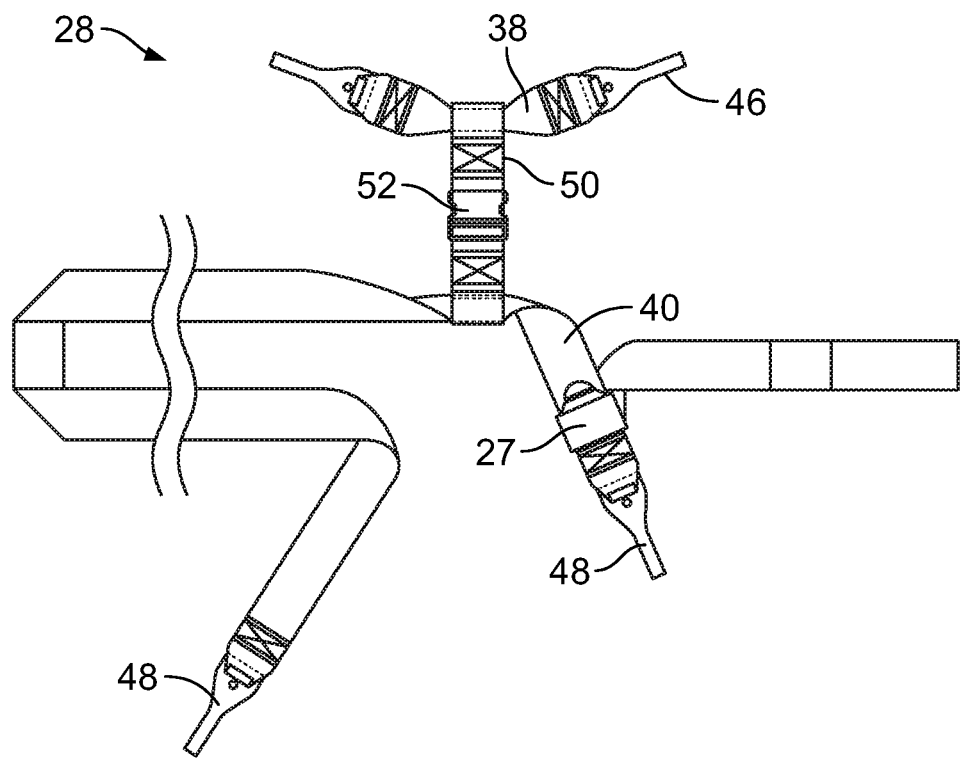
FIG. 4 is a schematic diagram of a tethering strap according to disclosed embodiments.

FIG. 4 is a schematic diagram of the tethering strap 28 according to disclosed embodiments. As seen in FIG. 4, in some embodiments, the first section 38 can include one or more fastening elements 46 configured to couple and decouple the tethering strap 28 to and from the one or more eye hole mounts 44 of the rear portion 30 of the upper attachment strap 24. In some embodiments, the fastening elements 46 and the one or more eye hole mounts 44 can be switched such that the rear portion 30 of the upper attachment strap 24 includes the fastening elements 46 and the first section 38 includes the one or more eye hole mounts 44. Furthermore, in some embodiments, the second section 40 can includes one or more fastening elements 48 configured to couple and decouple the tethering strap 28 to and from the one or more lower attachment straps 26.

As seen in FIG. 4, in some embodiments, the first section 30 can be coupled to the second section 40 by a central strap 50. For example, in some embodiments, the first section 30 is fed through a first loop of the central strap 50 and the second section 40 is fed through a second loop of the central strap 50. Furthermore, in some embodiments, the central strap 50 can include a set of energy absorbing rings 52 that absorb energy when the safety harness attachment system 20 is under strain to prevent or limit damage to the safety harness attachment system 20.

Figure 5:
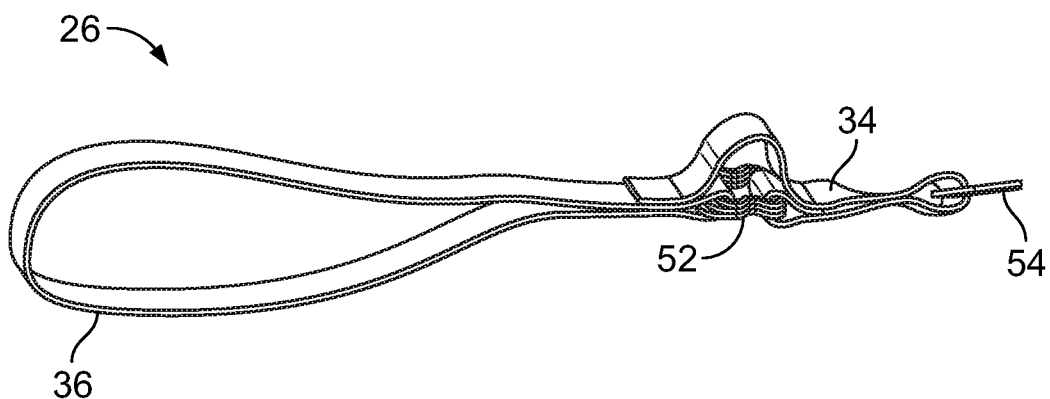
FIG. 5 is a perspective view of one or more lower attachment straps according to disclosed embodiments.

FIG. 5 is a perspective view of the one or more lower attachment straps 26 according to disclosed embodiments. As seen in FIG. 4 the one or more lower attachment straps 26 can include a respective set of energy absorbing rings 52 that are similar to the energy absorbing rings 50 of the tethering strap 28 and one or more eye hole mounts 54.

Figure 6:
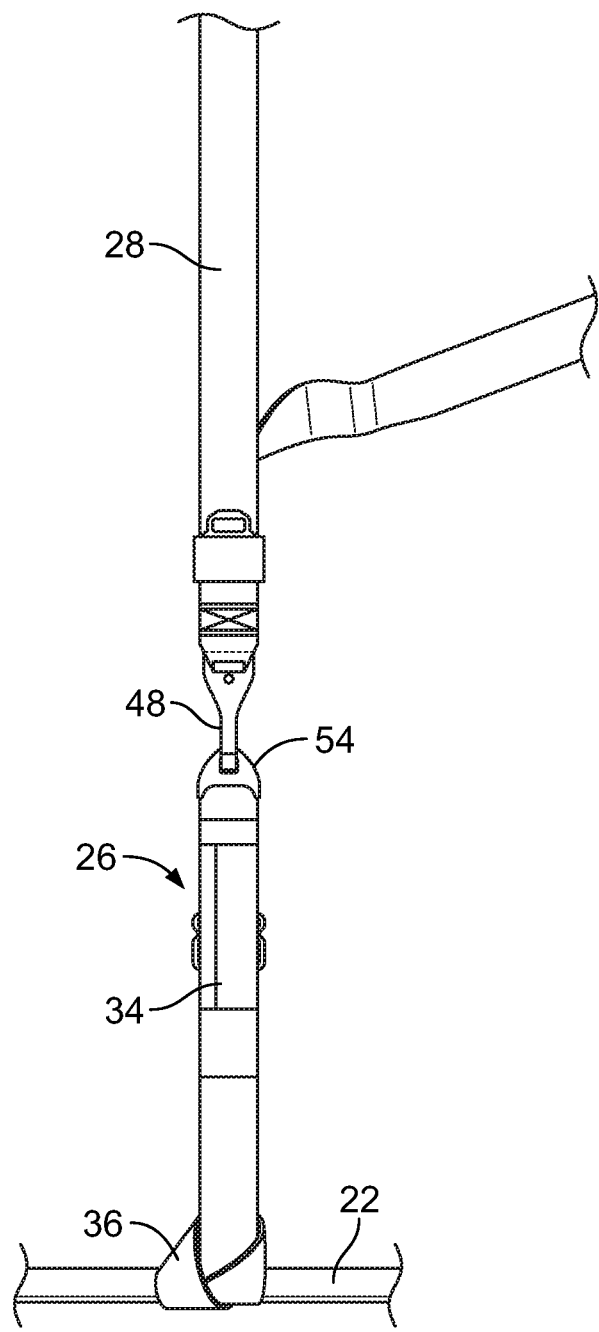
FIG. 6 is a perspective view of one or more lower attachment straps coupled to a tethering strap according to disclosed embodiments.

FIG. 6 is a perspective view of the one or more lower attachment straps 26 coupled to the tethering strap 28 and to the lower portion of the seat 22 according to disclosed embodiments. As seen in FIG. 6 the respective loop segment 36 can be configured to couple the one or more attachment straps 26 to the lower portion of the seat 22 when an exterior of the respective loop 36 is wrapped around the lower portion of the seat 22 and the respective upper portion 34 is fed through the respective loop 36.

Furthermore, as seen in FIG. 6 the one or more eye hole mounts 54 can receive the one or more fastening elements 48 to couple the one or more lower attachment straps 26 coupled to the tethering strap 28. In some embodiments, the fastening elements 48 and the one or more eye hole mounts 54 can be switched such that the one or more lower attachment straps 26 include the fastening elements 48 and the tethering strap includes the one or more eye hole mounts 54.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A safety harness attachment system comprising:
an upper attachment strap configured to receive a top portion of a seat, the upper attachment strap including a rear portion and a front portion configured to couple and decouple the front portion to and from the safety harness;
one or more lower attachment straps including a respective upper portion and a respective loop segment that is configured to couple the one or more attachment straps to a lower portion of the seat when an exterior of the respective loop is wrapped around the lower portion of the seat and the respective upper portion is fed through the respective loop;
a tethering strap including a first section configured to couple and decouple the tethering strap to and from the rear portion of the upper attachment strap and a second section configured to couple and decouple the tethering strap to and from the respective upper portion of the one or more attachment straps; and a first strap tightening mechanism coupled to one of the upper attachment strap, the one or more lower attachment straps, and the tethering strap and configured to tighten the one of the upper attachment strap, the one or more lower attachment straps, and the tethering strap, wherein, when the first section is coupled to the rear portion of the upper attachment strap, the second section is coupled to the respective upper portion of the one or more attachment straps, and the first strap tightening mechanism is used to tighten the one of the upper attachment strap, the one or more lower attachment straps, and the tethering strap, the upper attachment strap is secured to the lower portion of the seat through the tethering strap and the one or more lower attachment straps.

2. The safety harness attachment system of claim 1 wherein the first strap tightening mechanism is coupled to the upper attachment strap.

3. The safety harness attachment system of claim 1 wherein the first strap tightening mechanism is coupled to the one or more lower attachment straps.

4. The safety harness attachment system of claim 1 wherein the first strap tightening mechanism is coupled to the first section of the tethering strap.

5. The safety harness attachment system of claim 1 wherein the first strap tightening mechanism is coupled to the second section of the tethering strap.

6. The safety harness attachment system of claim 1 further comprising:
a second strap tightening mechanism coupled to the upper attachment strap and configured to tighten the upper attachment strap to secure the upper attachment strap to the top portion of the seat.

7. The safety harness attachment system of claim 1 wherein the upper attachment strap is configured to slide over the top portion of the seat.

8. The safety harness attachment system of claim 1 wherein the second section of the tethering strap includes one or more fastening elements configured to couple and decouple the tethering strap to and from respective eye hole mounts of the respective upper portion of the one or more lower attachment straps.

9. The safety harness attachment system of claim 1 wherein the respective upper portion of the one or more lower attachment straps includes respective fastening elements configured to couple and decouple the one or more lower attachment straps to and from one or more eye hole mounts of the second section of the tethering strap.

10. The safety harness attachment system of claim 1 wherein the first section of the tethering strap includes one or more fastening elements configured to couple and decouple the tethering strap to and from one or more eye hole mounts of the rear portion of the upper attachment strap.

11. The safety harness attachment system of claim 1 wherein the rear portion of the upper attachment strap includes one or more fastening elements configured to couple and decouple the upper attachment strap to and from one or more eye hole mounts of the first section of the tethering strap.

12. The safety harness attachment system of claim 1 wherein the first section of the tethering strap is coupled to the second section of the tethering strap by a central strap.

13. The safety harness attachment system of claim 12 wherein the first section is fed through a first loop of the central strap and the second section is fed through a second loop of the central strap.

14. The safety harness attachment system of claim 12 wherein the central strap includes a set of energy absorbing rings.

15. The safety harness attachment system of claim 1 wherein the one or more lower attachment straps include a respective set of energy absorbing rings.

16. An anchor assembly for use in a vehicle with a lap seatbelt system comprising:
a plurality of straps for attaching to an upper surface of a vehicle seat, including:
a first anchoring strap for encircling an upper portion of the vehicle seat;
a second anchoring strap having first and second ends fixed to first and second locations on the first anchoring strap, the second anchoring strap for extending over the upper surface of the vehicle seat;
a first connection mechanism having: a first end for slidingly engaging a first segment of the second anchoring strap, and a second end for securely engaging a first shoulder portion of a safety restraint system; and
a second connection mechanism having: a first end for slidingly engaging a second segment of the second anchoring strap, and a second end for securely engaging a second shoulder portion of the safety restraint system;
wherein when an individual wearing the safety restraint system is seated inside the vehicle and restrained by the lap seatbelt, the anchor assembly secures the individual to the upper portion of the vehicle seat by slidingly engaging the first and second shoulder portions of the safety restraint system to the upper portion of the vehicle seat.

17. The anchor assembly of claim 16, comprising a tethering system comprising:
a tethering member comprising:
an upper connecting member;
a lower connecting member; and
an elongated central strap attaching the connecting members; and
a third connection mechanism having: a first end portion for slidingly engaging a third segment of the second anchoring strap, and a second end portion for securely engaging a first end portion of the upper connecting member; and
a fourth connection mechanism having: a first end portion for slidingly engaging a fourth segment of the second anchoring strap, and a second end portion for securely engaging a second end portion of the upper connecting member;
wherein when the anchor assembly secures the individual to the upper portion of the vehicle seat, the upper connecting member is for engaging the anchor assembly, and the lower connecting member includes a first end portion for securely engaging a first rear portion of the vehicle seat and a second end portion for securely engaging a second rear portion of the vehicle seat.

\* \* \* \* \*